VARIABLE-GAIN AMPLIFIER

Filed July 7, 1965 2 Sheets-Sheet 1

INVENTOR
CONRAD H. KONING
BY Wilson, Robbins & Anderson
ATTORNEYS

INVENTOR
CONRAD H. KONING
BY Wilson, Robbins & Anderson
ATTORNEYS

United States Patent Office 3,412,339
Patented Nov. 19, 1968

3,412,339
VARIABLE-GAIN AMPLIFIER
Conrad H. Koning, 4923 Marmol Drive,
Woodland Hills, Calif. 91364
Filed July 7, 1965, Ser. No. 470,143
1 Claim. (Cl. 330—24)

ABSTRACT OF THE DISCLOSURE

A variable-gain circuit is disclosed utilizing a plurality of parallel paths each of which includes a semi-conductor. A network variously biases the semi-conductor to different levels of cut off, then each is driven by a control signal. The outputs from the parallel paths are summed to provide the desired output. One embodiment incorporates modulation.

The present invention relates to an electrical analog system, which may be embodied in a unit to provide an electrical output signal that is related to an input signal, modified in accordance with a predetermined function as manifest by another signal.

In general, a variety of applications exist for an electrical system to vary a signal in accordance with a predetermined function and the amplitude of a control signal. Specifically, for example, these applications include linear and non-linear voltage-variable attenuators, automatic amplifier gain control circuits, non-linear function generators, logarithmic amplifiers and attenuators, analog multipliers and other operational amplifiers.

In general, systems for these applications have included a wide variety of different electrical apparatus. For example, potentiometers controlled by servomechanisms have been employed, as have electron-beam apparatus, light-controlled resistor networks, field-effect transistor systems and so on. However, the systems previously employed have normally been rather complex, and often have lacked complete reliability. Therefore, a need exists for an improved system with predictable operating characteristics, that is usable in the applications considered above, and reasonably economical to manufacture.

A need sometimes arises for an electrical system to perform four-quadrant analog multiplication. That is, the need arises for an electrical system to provide an output that is representative of the product of two analog signals and which is operative for both positive and negative quantities. For example, if the system receives two positive-quantity signals, or two negative-quantity signals, the output is positive. However, if the system receives one positive-quantity signal and one negative-quantity signal, then the output signal representing the product must be designated negative. In general, systems capable of the four-quadrant multiplication operative have been rather complex and expensive. Therefore, considerable need exists for a reliable inexpensive system capable of four-quadrant multiplication.

Accordingly, it is an object of the present invention to provide an improved signal-modifying system that is not subject to these and other disadvantages of prior systems.

Still another object of the present invention is to provide an improved system for modifying an electrical signal in accordance with a predetermined function under control of a signal, which system is stable, predictable, reasonably economical and accurate.

Still another object of the present invention is to provide an improved system for reliably modifying an electrical signal in accordance with a control signal, to obtain accurate sum and difference frequencies in an output signal, without the attendant side bands normally encountered when non-linear techniques are employed.

A further object of the present invention is to provide an improved system for use, as in an analog computer, which system is capable of relatively accurate four-quadrant multiplication.

Still one further object of the present invention is to provide an electrical system for functionally combining electric signals, which system incorporates a plurality of impedance devices and a like plurality of switch devices for individually connecting the impedance devices to selectively receive an input signal and further means for controlling said switch devices in accordance with a control signal and still further including an output means for combining the signals from each of said impedance devices.

Further details of these and other novel features of the present invention along with the operation thereof and as well as additional objects and advantages of the present invention will become apparent and will best be understood from a consideration of the following description taken in conjunction with the accompanying drawings which are all presented by way of illustrative examples only; and in which.

Figure 1:
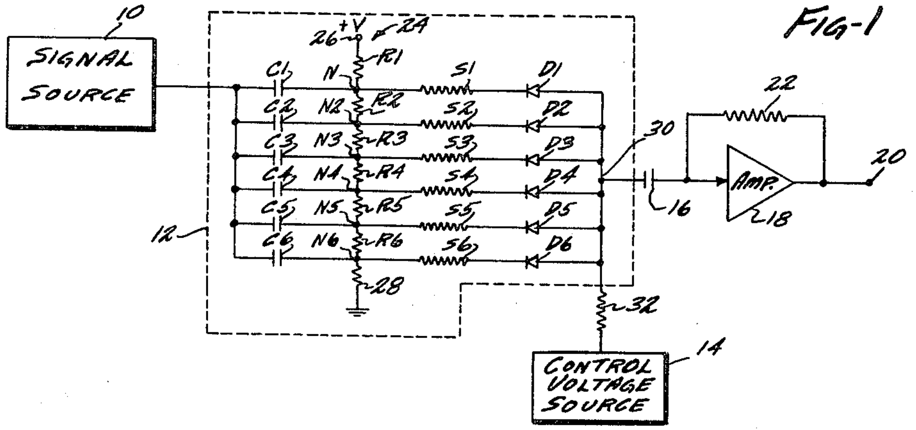
FIGURE 1 is a diagrammatic representation of one form of the present invention.

Referring initially to FIGURE 1, there is shown a first signal source 10 which provides an AC signal for example, and which may be representative of intelligence in accordance with the amplitude or frequency thereof. The signal from the source 10 is applied to a network 12, the output of which is functionally related to the signal from the source 10 in accordance with the amplitude of a DC control signal supplied from a control voltage source 14. The output from the network 12 is applied through a DC blocking capacitor 16 to an amplifier 18 the output of which appears at a terminal 20 and is returned through a feedback resistor 22 to the input of the amplifier 18. The feedback arrangement is such that a current flows through the resistor 22 to develop an AC voltage which is a fraction of the input signal. In accordance with the various circuit parameters selected, the signal appearing at the terminal 20 may represent the product of the signals from the sources 10 and 14, or otherwise be functionally related to the input signal from the source 10 in accordance with the amplitude of the control voltage from the source 14.

Considering the network 12 in greater detail, a voltage divider 24 is connected between a terminal 26 (adapted to be energized by a source of positive DC potential) and reference or ground potential. The divider 24 incorporates a series of resistors serially connected and designated R1, R2, R3, R4, R5, R6, and terminated in a resistor 28. The junction points between each of the resistors in the divider 24 provide nodes N1, N2, N3, N4, N5, N6, to which other elements are connected. Specifically, the signal source 10 is connected to each of the nodes N1 through N6, through a series of capacitors C1, C2, C3, C4, C5, and C6. The nodes N are also connected to the output of the network. Specifically, the nodes N1 through N6 are connected through a group of series circuits each incorporating a resistor S and a diode D which are connected in common to the capacitor 16 through a junction point 30. More specifically, the resistors in each of the series circuits are designated S1 through S6 respectively while the diodes associated therewith are designated D1 through D6 respectively. The junction point 30 (connected to each of the series circuits incorporating a resistor S and a diode D) is then connected to the control voltage source 14 through a resistor 32 to limit AC current flow from the junction 30.

Considering the operation of the system of FIGURE 1, it is to be understood that the direct-current bias voltage applied to the divider 24 at the terminal 26 produces a current through the resistors R1 through R6 and resistor 28 resulting in various levels of potential at the nodes N1 through N6. In the system of FIGURE 1, the resistors R1 through R6 are of similar resistance; therefore, the nodes N1 through N6 are at substantially equally spaced levels of potential. As a result, the node N6 is at a potential slightly above ground or reference level, while the node N1 is at a potential only slightly less than the potential applied to the terminal 26. The interior nodes are then at intermediate potentials.

As a result of the stepped positive voltage levels at the nodes along the divider 24, the diodes D1 through D6 are reverse biased when the system is in the quiescent state with the potential of the junction 30 substantially at ground level. Considering the alternating-current signal from the source 10, applied across the capacitors C1 through C6 to the nodes N1 through N6 and then to the resistors S1 through S6. The signal encounters the diodes D1 through D6, reversed biased so that no current passes. Now, assume that the control voltage source 14 provides an increasing DC positive potential through the resistor 32 to the junction 30. As the potential at the junction 30 is gradually increased, the diode D6 (reversed biased by the level of potential at the node N6) becomes forward biased when the potential at the junction 30 rises above the potential at the node N6. Thereupon, the AC signals from the signal source 10 is passed through the capacitor C6, and the resistor S6, to be coupled through the diode D6 to the junction 30. This signal then passes through the capacitor 16 to the amplifier 18 to provide an output signal at the terminal 20.

In the described operation, it may be noted that the amplitude of the signal appearing at the output terminal 20 is proportional to the instantaneous value of the signal from the source 10, and the ratio of the feedback resistor 22 to the series resistor S6.

As the magnitude of the DC control voltage from the source 14 increases, the voltage level at the junction 30 exceeds the voltage level at the node N5 with the result that the diode D5 is biased for conduction and the AC signal from the signal source 10 may then pass through both the resistors S5 and S6 to the junction 30. As a result, the effective resistance of the network 12 is reduced thereby increasing the amplitude of the output signal at the terminal 20 in accordance with the ratio set forth above. That is, the output signal is proportional the instantaneous value of the input signal and the ratio of the feedback resistor 22 to the effective resistance of the network 12.

As the amplitude of the control voltage from the source 14 is progressively increased, each of the diodes in the network 12 are progressively forward biased with the result that at full operating level, current flows through all of the resistors S1 through S6. As a result, maximum or peak AC operating level signal appears at the output terminal 20. As the control voltage is increased in the manner described, DC currents through the diodes D1 through D6 add to the biasing current through the divider 24 and may present a potential source of error; however, correction may be provided by unequal resistors R1 through R6 in the divider, or by providing the resistors S1 through S6 very large relative the resistors R1 through R6.

The level of the output signal at the terminal 20 may be varied within limits for certain applications. For example, if the resistance of the feedback resistor 22 is increased, less feedback is provided with the result that a higher output signal appears at the terminal 20. Control in this regard is also afforded by the value of the resistors S1 through S6 because if these resistors are larger, the input to the amplifier 18 is attenuated resulting in a reduced level of amplitude for the output signal at the terminal 20. Therefore, as the control voltage from the source 14 varies, for any particular design configuration, the output signal at the terminal 20 is so functionally related to the signal from the source 10.

The system of FIGURE 1 serves for alternating input signals, as direct-current components are essentially blocked in the network 12 by the capacitors C1 through C6 and capacitor 16. The situation sometimes arises when it is desired to provide an output that is functionally related to a DC input signal in accordance with a control voltage. A system affording such operation is presented in FIGURE 2 and will now be considered in detail.

Figures 2, 5, 6:
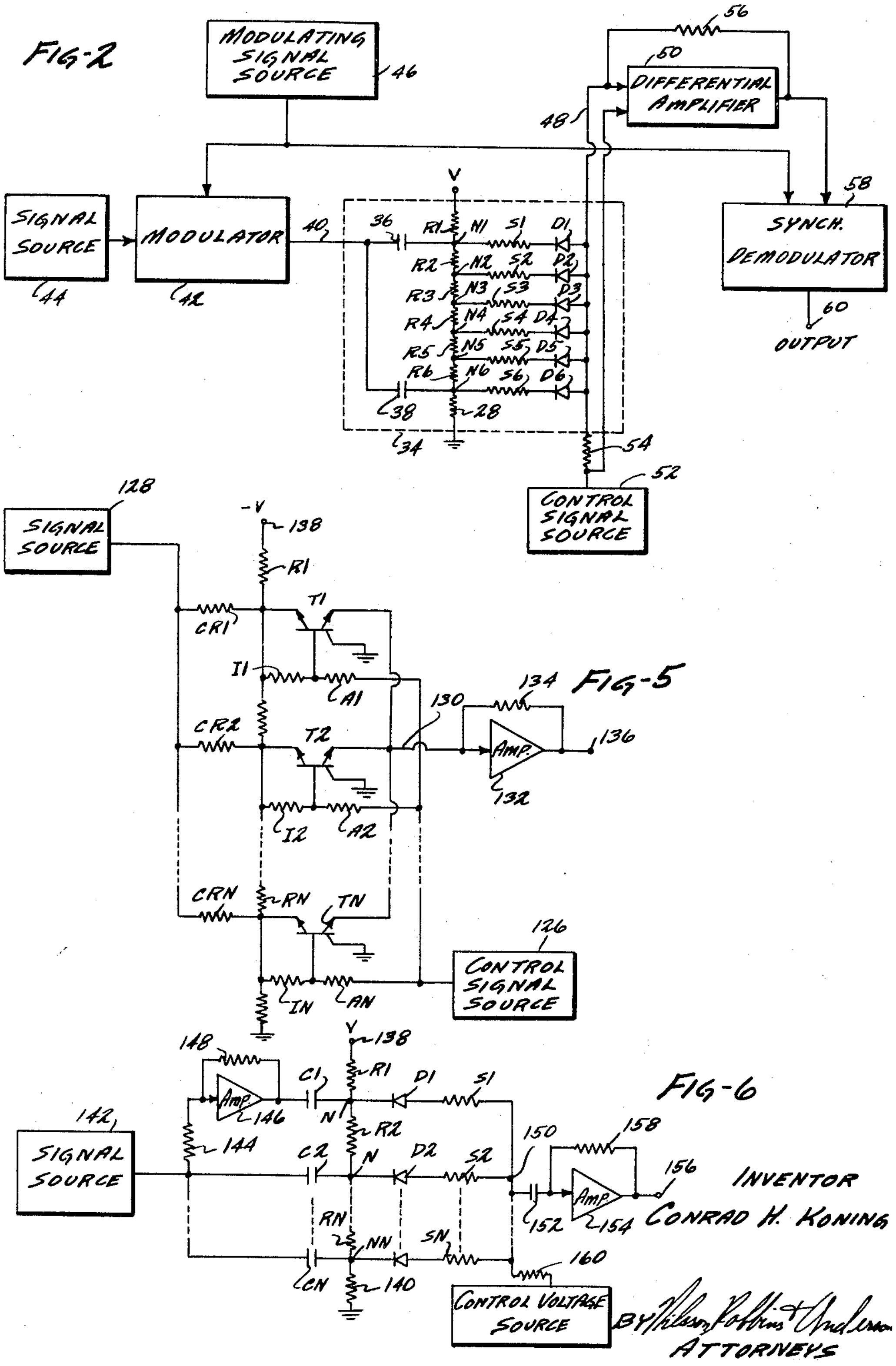
FIGURE 2 is a diagrammaic representation of another form of the present invention.
FIGURE 5 is a diagrammatic representation of still a further form of the present invention.
FIGURE 6 is a diagrammatic representation of one further form of the present invention.

The system of FIGURE 2 incorporates a network 34 that is generally similar to the network 12 as previously considered, however excepting the capacitors C1 through C6 which are replaced in the network 34 by a pair of capacitors 36 and 38 coupling the nodes N1 and N6 respectively to an input conductor 40. Only two capacitors 36 and 38 are provided in the system because the resistors R1 through R2 of the divider are small relative to series resistors S1 through S6 causing the node voltages to be somewhat equally spaced. The remaining elements of the network as shown in FIGURE 2 are similar to those previously considered with respect to FIGURE 1, and are therefore similarly identified.

The input line 40 to the resistor-diode matrix or network 34 is connected to the output of a modulator 42 which receives signals from a signal source 44. The modulating signal for operation of the modulator 42 is provided from an AC signal source 46. Thus, the conductor 40 receives the signal from the source 44 in a modulated form, and applies that signal to the network 34, the output of which appears in a conductor 48 for application to a differential amplifier 50. The differential amplifier 50 receives a reference level of potential from the control signal source 52 so that the input signal to the amplifier 50 is developed across a blocking resistor 54 which is chosen to be small so that the DC voltage of the conductor 48 and the DC level of the control signal from the source 52 are approximately equal. As a result, the amplifier 50 acts upon the difference between the total voltage (AC plus DC) and the DC voltage with the result that the DC control voltage is essentially eliminated. The differential amplifier 50 acting on such an input also incorporates a feedback loop through a resistor 56 as previously considered.

The output from the differential amplifier 50 is applied to a synchronous demodulator 58 which receives an input signal from the modulating signal source 56 so as to synchronously demodulate the output signal appearing at an output terminal 60. Thus, the output signal at the terminal 60 is functionally related to the input signal from the source 44 (including the direct-current component) and the level of the DC control signal provided from the control signal source 52. In this regard, if the control transfer function is made linear, the system may serve as an analog multiplier unit or in various other similar applications.

It is to be noted, that in the operation of the system as described in reference to FIGURE 2, the six diodes D1 through D6 provided in a circuit result in a step-influence in the output signal due to the somewhat threshold operating characteristic of the diodes. In this regard, six diode circuits and cooperating paths were arbitrarily selected as merely exemplary, and it is to be understood that the number of diode-resistor circuit paths associated in a network may be increased to afford smoother operation, or in certain instances decreased for a particular application.

Along with providing several separate diode paths in the system to reduce distortion, another variation may be provided to improved linearity in handling large peak-to-peak input signals. That is, more specifically, when the control signal from the source 52 is at a low level, e.g. ground potential, the signals from the input source 14 may have a sufficiently high peak-to-peak amplitude that the negative excursions forward bias some of the diodes into conduction. As a result, the negative excursions of the input signal may produce a greater amplitude in the output signal than similar positive excursions of the input signal.

Figure 3:
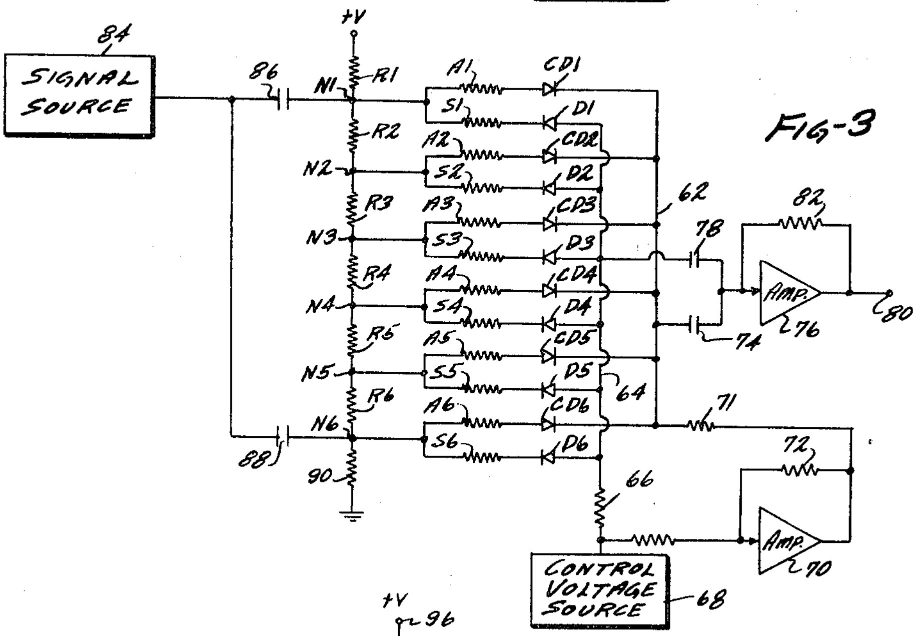
FIGURE 3 is a diagrammatic representation of still another form of the present invention.

This type of distortion is corrected in the system of FIGURE 3 wherein an added set of oppositely-sensed control diodes CD1 through CD6 are connected in series respectively with added resistors A1 through A6. The resulting serial circuits are connected between the nodes N1 through N6 respectively and a common output conductor 62 in a network as previously described. The diodes D1 through D6 along with the resistors S1 through S6 and resistors R1 through R6 are, (as previously disclosed in the configurations of FIGURES 1 and 2) connected to a common output conductor 64. The output conductor 64 is connected through a blocking resistor 66 which is in turn connected to the control voltage source 68. The control voltage source 68 is also connected to an inverting amplifier 70, incorporating a feedback loop containing a resistor 72. The output of the amplifier 70 is connected to the conductor 62 through a blocking resistor 71. The conductor 62 is also connected through a blocking capacitor 74 to an output amplifier 76 while the conductor 64 is connected through a similar capacitor 78 to the amplifier 76. The amplifier 76 incorporates a feedback loop through the output terminal 80 which includes a resistor 82 as previously described.

In the operation of the system of FIGURE 3, the input signal from the signal source 84 is provided through a pair of capacitors 86 and 88 which are connected respectively to the nodes N1 and N6. In this regard, the node N6 is isolated from ground potential by a resistor 90 while the node N1 (as previously described) is isolated from a source of positive potential by the resistor R1.

The signal applied from the source 84 is thus distributed along the nodes N1 through N6 of the divider network including the resistors R1 through R6. Conduction of current from these nodes N1 through N6 through any of the diodes D1 through D6 or CD1 through CD6 is controlled by the control voltage of the source 68 either directly, or in an inverted form, as supplied through the amplifier 70. As a result of the inverse connection of the diodes D1 through D6 in relation to the diodes CD1 through CD6, currents flowing to the conductors 62 and 64 are oppositely balanced. The system therefore presents a somewhat phase-balanced arrangement with the output to the conductors 62 and 64 added through the capacitors 74 and 78 to provide a composite signal applied to the amplifier 76.

Considering the system in greater detail, at a predetermined level of control voltage from the source 68, the diodes D5 and D6 for example, are forward biased. As a result, a positive excursion of the signal from the source 84 passes through the diodes D5 and D6 to appear on the conductor 64. In a somewhat similar fashion, a negative excursion of the signal from the source 84 is reflected through the diodes CD5 and CD6 which are forward biased by an inverted or opposed level of the control voltage so that balancing occurs between both positive and negative excursions in the output signal. That is, the diodes CD1 through CD6 are partial to conduction during positive excursions of the input signal while the diodes D1 through D6 are partial to conduction during negative excursions of the input signal. As a result, the two effects tend to cancel minimizing the distortion in the final output signal.

Figure 4:
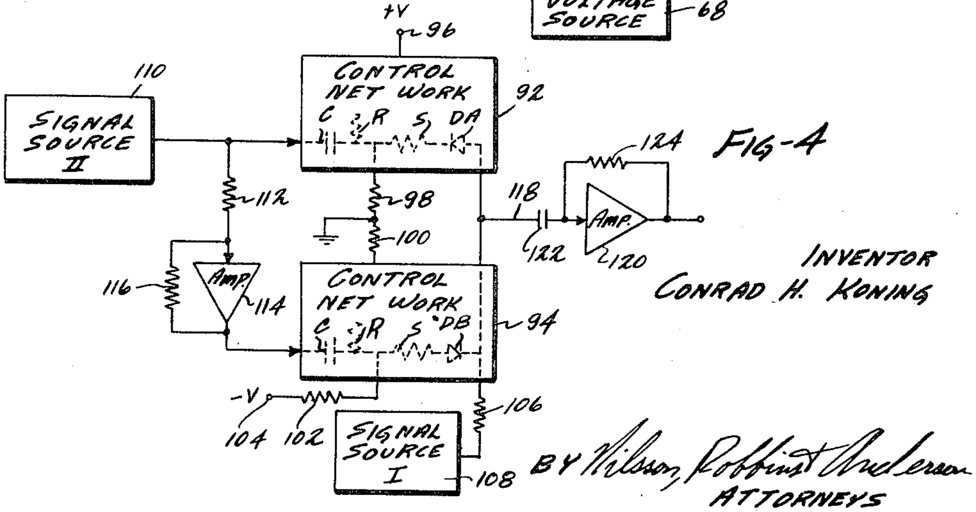
FIGURE 4 is a diagrammatic representation of a further form of the present invention.

As described above the system of the present invention may function as an analog multiplier. Furthermore, four-quadrant multiplication is possible, in which two variables are combined to provide a product, and if both variables are either positive or negative, the result is positive, while if one variable is positive and the other is negative, the result is negative. An embodiment of this system is shown in the diagram of FIGURE 4 incorporating two separate networks 92 and 94 similar to those previously described and each including a group of parallel circuits comprising a capacitor, a series resistor S, a diode DA or DB, and a voltage divider resistor R. It is to be noted, that the diodes DA in the network 92 are connected oppositely from the diodes DB in the network 94. Therefore, the conductive paths through the parallel circuits in the network 92 are opposite the paths through the network 94.

The voltage divider in the network 92 (as previously described) is connected between a source of positive potential applied at a terminal 96 and a resistor 98 which is connected to ground potential. However, from ground potential, connection is made through another resistor 100 to the voltage divider of the network 94, which is then terminated through a resistor 102 at a terminal 104 adapted to be connected to a source of negative potential.

The control signal input to the system of FIGURE 4 (which may comprise one of the variables, e.g. multiplier or multiplicand) is applied to both of the networks 92 and 94 as previously described through a resistor 106 from a signal source I identified by the numeral 108. The other variable input is from a signal source II labeled by the numeral 110 which is connected directly to the input of the network 92, and to the network 94 through a resistor 112 and an inverting amplifier 114 having a feedback loop including a resistor 116.

In the operation of the system, the diodes DA in the network 96 are normally biased beyond cutoff by the voltage applied through the voltage divider of the resistors R when the system is in a quiescent state. The oppositely poled diodes DB in the network 94 are similarly biased beyond cutoff by the negative voltages applied through the voltage divider including resistances R in the network 49.

This quiescent condition is altered when the signal from the source 108 becomes either sufficiently positive or negative to drive any of the diodes in the networks 92 and 94 into conduction. For example, when the signal from the source 108 becomes sufficiently positive, the contribution to the output conductor 118 is through the network 92. However, when the control voltage from the signal source 108 becomes sufficiently negative, the contribution to the amplifier output is from the network 94. As a result, the system functions as a four-quadrant multiplier because the output to the conductor 118 arriving from network 94 is phase inverted as a result of the amplifier 114 which is coupled to the network 94, and thereafter to the conductor 118, a capacitor 122 and an amplifier 120 with a feedback resistor 124.

In certain applications of the system of the present invention, it may be desirable to eliminate all capacitors as coupling elements so as to facilitate operation over exceedingly wide ranges of frequencies, and for example provide capability to perform a representative analog multiplication with a DC response and having a relatively high upper frequency limit. A system illustrative of such a capability is shown in FIGURE 5 and will now be considered in detail. In general, the system of FIGURE 5 employs dual emitter chopper transistors T1 through TN as switch elements. The collector leads of each of the transistors T1 through TN are grounded while the base electrodes are connected through resistors I1 through IN respectively to a voltage divider formed of resistances R1 through RN as previously described. The base electrodes are also connected through coupling resistors A1 through AN to the control signal source 126. The other signal source 128 is connected to the input emitter electrodes of each of the transistors T1 through TN, through a series of coupling resistors CR1 through CRN respectively. The output emitter electrodes are then connected in common to an output conductor 130 which is in turn connected to an output amplifier 132 having a feedback path incorporating a resistor 134 from an output terminal 136.

In the operation of the system, the transistors are cut off when the control voltage from the source 126 is at ground; however, when the base electrode of the transistor TN for example is driven sufficiently positive (by the control signal source 126) a current will flow between the common bases, (represented by the single base electrode of the transistor TN) to ground. When this current occurs, the resistance across the emitter electrodes of the transistor TN is low and the device is essentially switched to an "on" state. Conversely, if as initially assumed, the transistor is biased to an "off" state by the voltage divider network and the control signal source 126, a high resistance exists across the emitter electrodes. In this regard, the voltage divider comprising the resistors R1 through RN is biased by a negative voltage applied to a terminal 138. As a result, the applied negative voltage to the bases of the transistors must be overcome by the control signal to drive the transistors into conduction. Of course, as previously described, as a result of the step variation in voltages applied to each of the transistors, they are driven into conduction at different levels of the control signal. Therefore, as each of the transistors is progressively driven into conduction by higher levels of amplitude of the control signal from the source 126, a greater number of the transistors pass current through an impedance path from the signal source 128 which is amplified by the amplifier 132 and provided as an output signal functionally related to the signal from the source 128 in accordance with the amplitude of the control signal from the source 126.

In general, the operation of the system of FIGURE 5, as other prior systems described herein provides a monotonic functionally related output. That is, as the control signal increases, the output similarly increases. However, in certain instances, it is desirable to provide an output which is diminished at certain levels of increase of the control signal so that the first derivative in the function defining the relationship becomes negative within certain limits. A system for accomplishing such operation is shown in FIGURE 6 and will now be considered in detail.

In general, the network in the system of FIGURE 6 is similar to those previously described incorporating a plurality of serial circuits, each of which includes a capacitor, a diode, and a resistor. Specifically, the capacitors are designated C1 through CN while the diodes are designated D1 through DN and the series resistors are designated S1 through SN. The junction points or nodes designated N1 through NN, between the capacitors C and the diodes D are connected to a series of resistors R1 through RN as previously described to provide a voltage divider which variously biases the nodes N1 through NN. The voltage divider incorporates a terminal 138 to which a positive voltage is applied, and is terminated through a resistor 140 at ground potential. The input to the network consisting of the plurality of serial impedance circuits is from a signal source 142 connected directly to the capacitors C2 through CN, and connected through a resistor 144 and an amplifier 146 (incorporating a feedback loop containing a resistor 148) to the capacitor C1. The common output from the system is then taken from the series resistors S1 through SN into a conductor 150 which is in turn connected through a capacitor 152 and an amplifier 154 to an output terminal 156. The amplifier 154 is (as previously) provided with feedback through a loop including a resistor 158. The conductor 150 is also connected to receive control signals through a resistor 160 from the control voltage source 162.

The operation of the system of FIGURE 6 is generally similar to those previously described; however, a specific difference is that the amplifier 146 operates to invert the input signal from the source 142 with the result that an opposed polarity signal is applied at the node N2 which may act to subtract from the effect of the other signals applied through the capacitors C2 through CN. Thus, as the control signal from the source 162 increases, it adds positively phased signals to the summing conductor 150 to a certain point at which the negative signal is added from the node N1. As a result, the output appearing at the terminal 156 forms a peak in a functional relationship to the amplitude of the applied control voltage from the source 162 thus affording further flexibility in applications for the system of the present invention.

Thus, it is apparent that the system of the present invention may be applied in a variety of uses to accomplish a variety of different specific functions. In this regard, the system may incorporate many features including, capability to accommodate wide ranges of frequencies, facilities for four-quadrant multiplication, and so on as will be readily apparent to one skilled in the art from a consideration of this specification. Of course, it is to be understood that although several forms of the invention are shown and disclosed herein, the scope of the invention is not to be determined thereby but rather in accordance with the claim set forth below.

What is claimed is:

1. A variable-gain circuit for varying a first signal according to a second signal, and in accordance with a predetermined function, comprising: a plurality of electrical signal paths connected to receive said first signal and each including a semi-conductor element to be controlled by an electrical control signal and further including an impedance element; a bias circuit for providing a bias control signal to each of said semiconductor elements whereby said elements are variously biased to cutoff to afford different control levels; a control circuit for applying a variable control signal collectively to said semiconductor elements in accordance with said second signal and opposed to said bias control signal; and output means for combining the electrical currents from each of said electrical signal paths whereby to provide a varied form of said first signal as an output signal.

References Cited

UNITED STATES PATENTS

| | | | |
|---|---|---|---|
| 2,556,200 | 6/1951 | Lesti | 307—242 X |
| 2,581,124 | 1/1952 | Moe | 332—37 X |
| 2,827,611 | 3/1958 | Beck. | |
| 3,307,174 | 2/1967 | Klinikowski | 307—242 X |
| 3,316,421 | 4/1967 | Biard | 330—10 X |

NATHAN KAUFMAN, *Primary Examiner.*